(12) United States Patent
Baynard

(10) Patent No.: US 7,640,692 B1
(45) Date of Patent: Jan. 5, 2010

(54) TROLLING SYSTEM

(76) Inventor: David A. Baynard, 6529 Highway 260, Manning, SC (US) 29102

( * ) Notice: Subject to any disclaimer, the term of this patent is extended or adjusted under 35 U.S.C. 154(b) by 160 days.

(21) Appl. No.: 11/880,187

(22) Filed: Jul. 19, 2007

(51) Int. Cl.
*A01K 97/10* (2006.01)
(52) U.S. Cl. .................. 43/21.2; 248/512; 248/516; 248/518; 248/520; 248/521
(58) Field of Classification Search ............... 248/158, 248/163.2, 188.1, 511, 519, 523, 903, 121, 248/122.1, 125.2, 125.7, 125.9; 43/19.2, 43/21.2
See application file for complete search history.

(56) References Cited

U.S. PATENT DOCUMENTS

| | | | | | |
|---|---|---|---|---|---|
| 2,795,439 | A | * | 6/1957 | Smith | 285/110 |
| 4,124,190 | A | * | 11/1978 | Wheeler | 248/538 |
| 4,191,438 | A | * | 3/1980 | Day | 312/306 |
| 4,901,469 | A | * | 2/1990 | Murray | 43/21.2 |
| 5,282,596 | A | * | 2/1994 | White | 248/219.2 |
| 5,435,093 | A | * | 7/1995 | Minorics et al. | 43/19.2 |
| 5,461,817 | A | * | 10/1995 | Flood | 43/19.2 |
| 5,557,877 | A | * | 9/1996 | Colson | 43/21.2 |
| 5,617,962 | A | * | 4/1997 | Chen | 211/206 |
| 5,718,344 | A | * | 2/1998 | Joldeson et al. | 211/206 |
| 6,289,627 | B1 | * | 9/2001 | Gibbs et al. | 43/21.2 |
| 6,745,909 | B1 | * | 6/2004 | Lai | 211/206 |
| 6,796,446 | B2 | * | 9/2004 | Segall et al. | 211/206 |
| 2002/0067040 | A1 | * | 6/2002 | Marandi | 285/197 |
| 2005/0218291 | A1 | * | 10/2005 | Musk et al. | 249/43 |
| 2006/0170310 | A1 | * | 8/2006 | Leo et al. | 310/328 |
| 2008/0078277 | A1 | * | 4/2008 | Nortier et al. | 83/864 |

\* cited by examiner

*Primary Examiner*—J. Allen Shriver, II
*Assistant Examiner*—Alaeddin Mohseni
(74) *Attorney, Agent, or Firm*—McNair Law Firm, PA; Cort Flint

(57) ABSTRACT

A trolling system for mounting a plurality of fishing rods to extend from selected peripheral sides of a boat. The system includes a pair of mounting members attached to the deck and mounting rods extending parallel or transverse opposing sides of the boat. A trolling bar, which is secured with the mounting rods and rod supports in spaced positions. In use, fishing rods are mounted in the rod supports and extend from the stern of the boat.

11 Claims, 4 Drawing Sheets

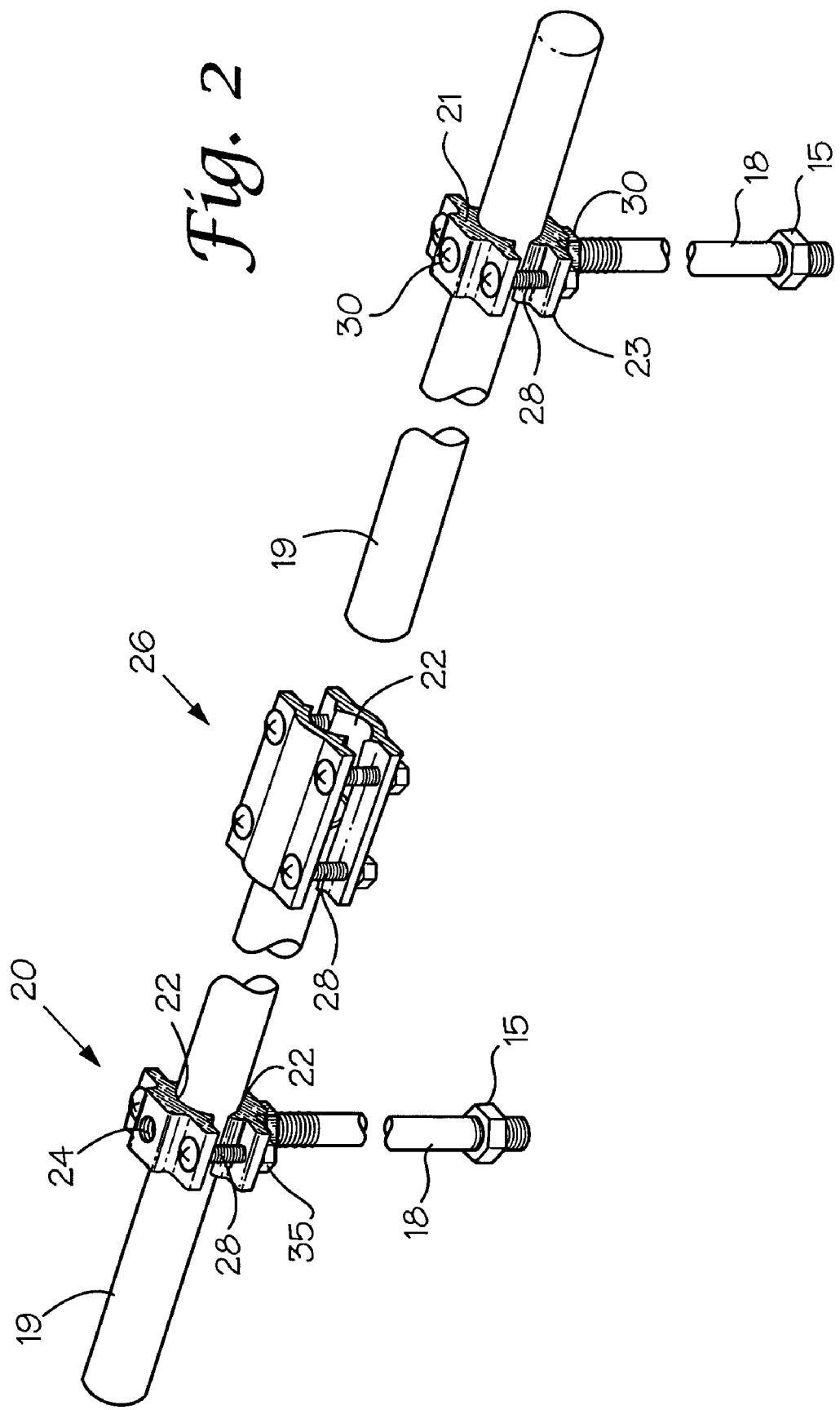

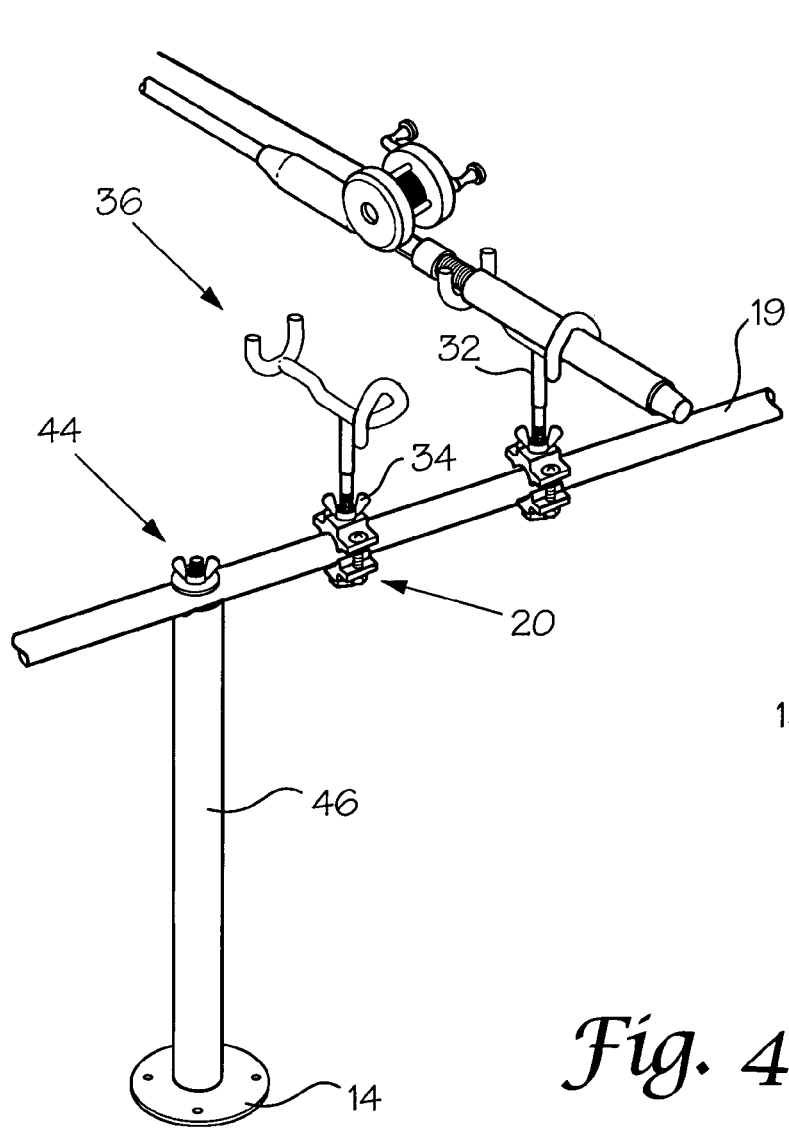
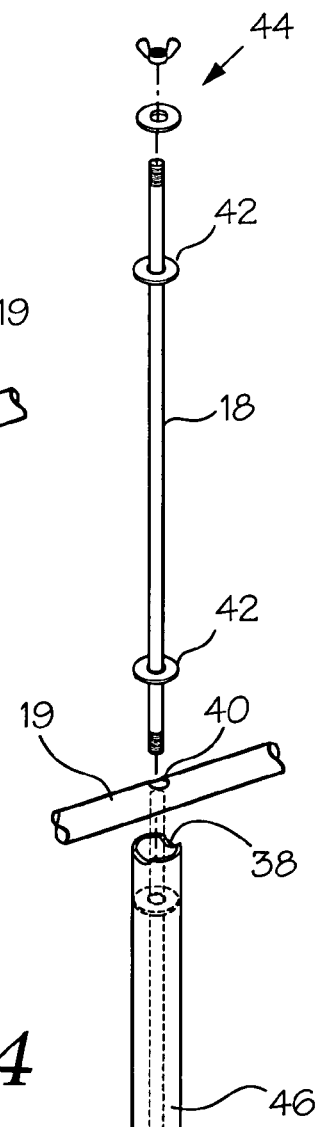
Fig. 3
Fig. 4

TROLLING SYSTEM

BACKGROUND OF THE INVENTION

This invention is directed to a system for mounting fishing rods across the stern of a boat for trolling. There are known many systems for mounting fishing rods along opposed sides of boats for trolling. This arrangement is satisfactory for a few lines but with a large number of lines, there is a problem with them becoming entangled.

Accordingly, it an object of the instant invention to provide a system for mounting fishing rods on a boat for trolling in spaced positions to reduce the chances of the lines becoming entangled.

Another object of the invention is the provision of mounting means across the stern of a boat.

Another object of the invention is an easily installable and removable fishing rod mounting system.

Another object of the invention is a trolling system which is sturdy and dependable.

Another object of the invention is a trolling system easily installed with and removed from the boat.

SUMMARY OF THE INVENTION

The instant invention is directed to a trolling system for mounting fishing rods from the stern of a boat. The system includes a mounting system having at least one mounting disk or clamp which is secured with decking or deck railing adjacent the stern of the boat. The mounting system includes at least one mounting rod secured with and extending vertically from the clamp or disk. A trolling bar which extends generally transverse of the longitudinal axis of the boat and generally parallel of the stern is engaged with the upper end of the mounting rod. A plurality of fishing rod holders are secured in spaced positions with the trolling bar for holding fishing rods in trolling positions.

The mounting system includes a pair of mounting disks each having a threaded bore. There is a pair of mounting rods, each having a threaded end. The mounting rods are engaged in the threaded bores and the trolling bar is secured with the upper ends of the mounting rods through a clamp member. The clamp members are secured with each mounting rod and the trolling bar. The clamps include a locking screw for locking the trolling bar against rotation.

The trolling bar may comprise two bars secured end-to-end by a clamp.

The mounting system may further include a support tube, positioned over each mounting rod. Spacers are provided for maintaining each tube evenly spaced from the associated mounting rod. The spacers may comprise rings carried by the mounting rods. The upper end of each support tube includes a shaped portion which conforms with a portion of the circumference of the trolling bar. The trolling bar includes spaced bores for receiving the upper ends of the support rods which allows the trolling bar to pass over the mounting rods and rest on the upper ends within the shaped portion of the support tubes. A nut is engaged with the threaded end portion of the mounting rods securing the trolling bar in position against the tubes and against rotation.

The instant trolling system includes clamping members adjustably secured in spaced positions along the trolling bar. Each of the clamping members includes a threaded bore adapted to mount a fishing rod holder in fixed position.

The entire trolling system, to include the mounting disk, the mounting rods, the trolling bar and the brackets may be made of metal. If desired, selected members may be formed of plastic.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 2 is a perspective view of the trolling bar and supports.

FIG. 3 is a sectional perspective view of a second arrangement of the trolling system.

FIG. 4 is an exploded sectional view of the arrangement shown in FIG. 3.

DESCRIPTION OF A PREFERRED EMBODIMENT

Figure 1A:
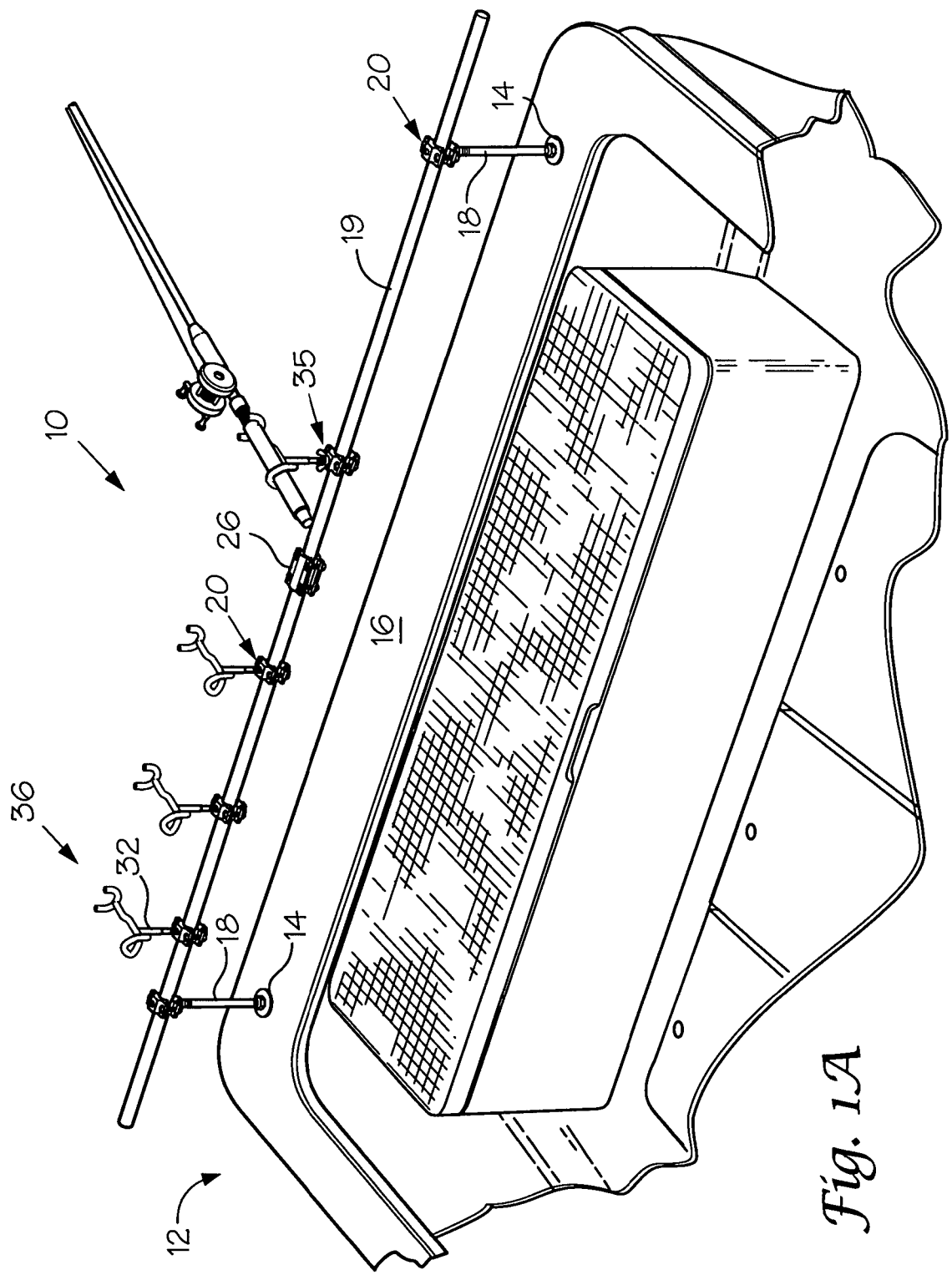
FIG. 1A is a sectional perspective view showing the bow of a boat equipped with the trolling system of the invention.

Referring now to the drawings, the invention will now be described in more detail.

Figure 1B:
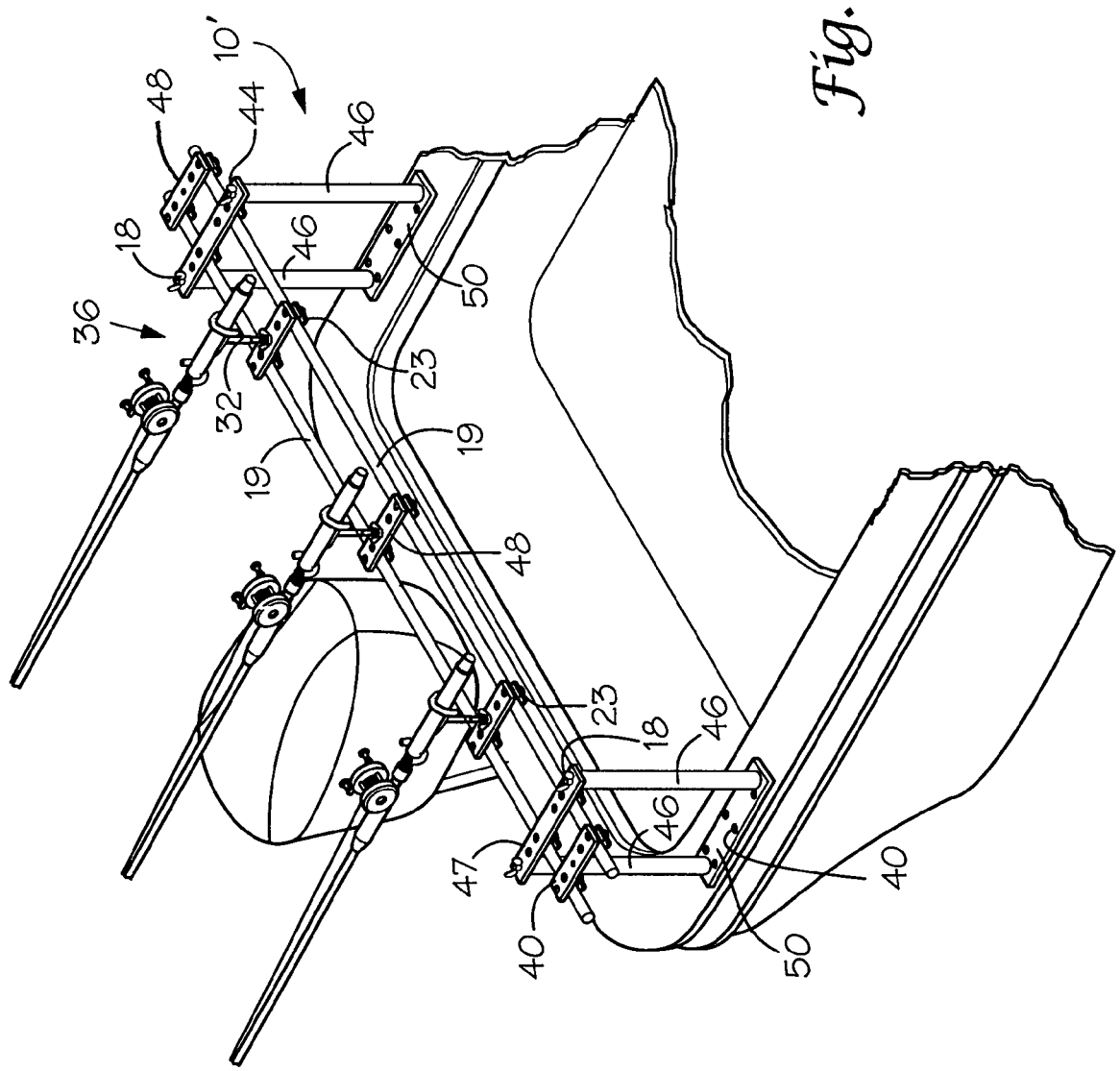
FIG. 1B is a sectional perspective view showing a variation of the trolling system of the invention.

The trolling system 10, as shown in FIGS. 1A and 1B, is mounted adjacent the stern of boat 12. The arrangement shown in FIGS. 1A and 2 comprises at least a pair of mounting members or disks 14 secured in spaced positions across desk 16, which extends across the stern of the boat.

A pair of mounting rods 18, each having threaded ends, are secured at one end in the threaded bores of disks 14 and extend vertically from disk 14 and deck 16. Locking bolts 15 may be provided to lock mounting rods 18 in engagement with disk 14. It is noted that in the event that the boat decking includes hand rails, it may be desirable to substitute saddle clamps 20 for disks 14 and secure rods 18 with the opposed hand rails.

Locking members in the form of brackets or saddle clamps 20 are secured with the upper ends of mounting rods 18 by way of a threaded bore to be described hereinafter.

Trolling bar 19 may be in the form of a tube or a bar or it may be comprised of a pair of bars secured together at opposed ends by bracket or saddle clamp 26. Four bolts 28 secure upper and lower sections of clamp 26 with the opposed ends of the pair of rods forming trolling bar 19.

Trolling bar 19, when in its preferred operative position, is mounted to extend across boat 12 adjacent its stern, as shown in FIG. 1A. A plurality of brackets or saddle clamps 20 are positioned in spaced positions along the trolling bar. The clamps each include an upper section 21 and a lower section 23 with each section having a shaped groove 22. Each section 21, 23 also includes bore 24. Fishing rod holders 36, which are commercially available, include stem 32 with a threaded lower end. Rod holders 36 are engaged with selected of clamps 20 by way of stem 32 securing with bore 24. Normally, wing or locking nuts 35 lock the fishing rod holders in position. It is noted that by providing wing nuts as securing members for upper and lower sections 21, 23, clamps 20 may be easily adjusted radially about bar 19 for adjusting the angular position of the rod holders.

Clamps 20 are also utilized to connect bar 19 with rods 28. The shaped grooves 22, formed in clamps 20 are sized to mate with the circumference of trolling bar 19. Lower sections 23 also include bores similar to bores 24 of upper section 21 which are also sized to mate with the threaded upper ends of mounting rods 18. Bores 24 of section 21 are sized to receive locking screw 30 which engages with and secures trolling bar 19 against rotation.

It is noted that in certain situations it may be desirable to a single mounting rod 18 mounted centrally of trolling bar 18. In this arrangement, rod holders 36 would be mounted on either side of mounting rod 18.

It is noted that stainless steel is preferred for forming all members of the structure. Other materials such as aluminum, brass, copper and molded plastics may be suitable and can be substituted as desired. The trolling bar is preferably 16 gauge×1" diameter stainless steel and up to 8' in length. The mounting rods are preferably ½" stainless steel and are between 10" and 30" in length.

In a second arrangement shown in FIGS. 3 and 4, the base members are identical. Mounting disk 14 is secured with deck 16 and includes a threaded bore 11. Mounting rod 18 is secured in bore 11 and extends perpendicularly from deck 16 as earlier described. Support tube 46 is positioned over mounting rod 18 with its lower end resting on mounting disk 14. Spacers 42 are positioned along rod 18 and act to maintain support tube 46 evenly spaced from the rod. The upper end of support tube 46 comprises an arcuate shaped portion 38 which is designed to mate with a portion of the circumference of trolling bar 19. In position, contoured portion 38 is located below the upper end of mounting rod 18 a distance slightly greater than the diameter of the rod. A pair of bores or holes 40 are formed in trolling bar 19, in spaced positions equal the spacing of mounting rods 18. In position, the upper end of each mounting rod 18 extends through a bore 40 allowing the trolling bar to rest in shaped portions 38 and be vertically supported by support tube 46. A locking member in the form of a nut washer arrangement 44 secures the trolling bar in position.

The trolling bar, when secured in position, is ready to receive a plurality of brackets 20 which, in turn, each mount a fishing rod holder 36 as earlier described.

Again, in certain instances only one mounting rod 18 and support tube 46 may be desired to mount the trolling bar 19 as earlier set forth.

Referring now to FIG. 1B, another arrangement of the trolling system is shown. In system 10¹, a pair of trolling bars 19 are connected at opposing ends with an elongated support plate 47. Support plates 47 include a plurality of bores 40 which receive the upper ends of mounting rods 18 in spaced positions. The mounting rods 18 are encased with tubes 46, the upper ends of which support the elongated plates 47. Locking members 44, either bolts or wing nuts, secure elongated plates in position. This is substantially the mounting arrangement shown in FIG. 4.

The lower ends of rods 18 are secured in threaded bores 40 formed in elongated mounting plate or elongated mounting member 50.

Mounting plates 48 are arranged across trolling bars 19 and are secured in position using bolts 28 and a section of bracket 20 such as lower section 23. Rod holders 36 are engaged in bores 40 as earlier described. This arrangement provides greater stability.

Fishing rods are mounted in the fishing rod holders to extend rearwardly and generally parallel with the longitudinal axis of the boat.

It is noted that in both arrangements, only one mounting rod and associated members may be employed to locate the trolling bar or bars or the system may require the use of two or more mounting rods and associated members. The length of the trolling bar or bars is the determining factor.

While a preferred embodiment of the invention has been described using specific terms, such description is for illustrative purposes only, and it is to be understood that changes and variations may be made without departing from the spirit or scope of the following claims.

What is claimed is:

1. A mounting system for mounting fishing rods from the stern of a boat for trolling comprising:
    at least one mounting member secured with a deck extending across a stern of said boat;
    a mounting rod having a threaded upper end is secured with and extends vertically from each said mounting member;
    a trolling bar is engaged with said upper end of said mounting rod to extend generally the width of said stern and perpendicular the longitudinal axis of said boat;
    a locking member engaged with said threaded upper end and said trolling bar secures said trolling bar in a fixed stationary position relative to said stern;
    clamping and support members secured in spaced positions along said trolling bar, said clamping and support members each having a bore adapted to mount a fishing rod holder in fixed position;
    a plurality of fishing rod holders secured with said clamping and support members for holding fishing rods in trolling positions.

2. The trolling system of claim 1 wherein said at least one mounting member comprises a pair of mounting members arranged in spaced positions generally parallel of said stern.

3. The trolling system of claim 2 wherein said mounting members each include a threaded bore and said mounting rods each include a threaded end, said mounting rod threaded ends being engaged in said threaded bores.

4. The trolling system of claim 2 wherein said trolling bar is secured with said threaded upper ends of said mounting rod through a clamp member.

5. The trolling system of claim 1 wherein said mounting system further includes a support tube positioned over each said mounting rod, upper ends of said support tubes mating with and supporting the outer circumference of said trolling bar.

6. The trolling system of claim 5 including spacers maintaining each said tube evenly spaced from the associated said mounting rod.

7. The trolling system of claim 6 wherein said spacers comprise rings carried by said mounting rod.

8. The trolling system of claim 5 wherein said trolling bar includes spaced holes, said mounting rods passing through said holes allowing said trolling bar to rest on said upper ends of said support tubes, said locking member comprising a nut engaged with a threaded end portion of said mounting rods securing said trolling bar in position relative to said mounting rods and against rotation.

9. The trolling system of claim 1 wherein said mounts, mounting rods and trolling bar are made of metal.

10. A trolling system for mounting fishing rods to extend over the peripheral sides of a boat comprising:
    a mounting system supporting a trolling bar in a position generally transverse an axis of said boat and elevated from selected of said sides;
    a plurality of fishing rod holders mounted in spaced positions along said trolling bar in position to direct fishing rods over said selected of said sides in a trolling position;
    said mounting system including mounting members carried by said selected of said sides supporting in a generally vertical position mounting rods having threaded upper ends and a support tube positioned over each said mounting rod with its upper end vertically spaced below said upper end of the associated said mounting rod; wherein, each said upper end of said mounting rods passes through a bore in said trolling bar allowing said trolling bar to rest on the upper ends of said support tubes and a locking member mated with each said upper end of said mounting rods engaging with and locking said trolling bar in stationary position with said support tube.

11. The trolling system of claim 10 wherein there are two trolling bars arranged in parallel positions across said boat.

* * * * *